(12) United States Patent
Whitney et al.

(10) Patent No.: US 10,380,867 B2
(45) Date of Patent: Aug. 13, 2019

(54) ALERT MANAGEMENT WITHIN A NETWORK BASED VIRTUAL COLLABORATIVE SPACE

(71) Applicant: AppDynamics LLC, San Francisco, CA (US)

(72) Inventors: Jonathan Newcomb Swirsky Whitney, Belmont, CA (US); Tao Wang, Daly City, CA (US); Ryan O'Connell, San Francisco, CA (US); Valeriy Chibisov, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 226 days.

(21) Appl. No.: 15/142,755

(22) Filed: Apr. 29, 2016

(65) Prior Publication Data

US 2016/0321906 A1    Nov. 3, 2016

Related U.S. Application Data

(63) Continuation-in-part of application No. 14/610,747, filed on Jan. 30, 2015, now Pat. No. 9,800,473.

(51) Int. Cl.
| | |
|---|---|
| *G06F 11/30* | (2006.01) |
| *G06F 11/00* | (2006.01) |
| *G08B 21/18* | (2006.01) |
| *G06F 3/0482* | (2013.01) |
| *G06F 17/24* | (2006.01) |

(Continued)

(52) U.S. Cl.
CPC ......... *G08B 21/182* (2013.01); *G06F 3/0482* (2013.01); *G06F 3/0484* (2013.01); *G06F 17/2247* (2013.01); *G06F 17/248* (2013.01); *G06Q 10/101* (2013.01); *H04L 41/069* (2013.01)

(58) Field of Classification Search
None
See application file for complete search history.

(56) References Cited

U.S. PATENT DOCUMENTS 7,599,964 B1 * 10/2009 Bozek .................... G06Q 10/06
7,752,301 B1 *  7/2010 Maiocco ............... G06F 15/173
                                                                709/224

(Continued)

FOREIGN PATENT DOCUMENTS

EP           2728540 A1 * 10/2013

*Primary Examiner* — Yongjia Pan
(74) *Attorney, Agent, or Firm* — Behmke Innovation Group LLC; James Behmke; Stephen D. LeBarron (57) ABSTRACT

A network-based collaborative problem solving space is provided for managing alerts. The virtual collaboration space provide a virtual space for viewing streaming time series data, generating alerts for time series data, and viewing triggered alerts based on a threshold associated with the generated alert. Alert generation and triggering is automatically tracked within an event log, with particular event log entries associated with the alert generation and the triggering of an alert. When an alert is triggered, a link to the event log entry associated with generating the alert is provided. By reviewing the alert generation and surrounding event log entries, users of the virtual collaboration space may gain context as to the motivations for generating the original alert and thereby better understand whether the triggering of the alert is a serious issue.

16 Claims, 11 Drawing Sheets

(51) Int. Cl.
*G06F 17/22* (2006.01)
*G06F 3/0484* (2013.01)
*H04L 12/24* (2006.01)
*G06Q 10/10* (2012.01)
*G06F 11/34* (2006.01)
*G06F 11/07* (2006.01)

(56) References Cited

U.S. PATENT DOCUMENTS

| | | | | |
|---|---|---|---|---|
| 7,822,848 | B2* | 10/2010 | Muller | G06F 9/451 |
| | | | | 709/224 |
| 7,856,498 | B2* | 12/2010 | Hughes | G06Q 10/107 |
| | | | | 709/223 |
| 8,015,137 | B2* | 9/2011 | Allen | G06Q 10/10 |
| | | | | 706/45 |
| 8,527,596 | B2* | 9/2013 | Long | G06Q 30/02 |
| | | | | 709/204 |
| 8,620,709 | B2* | 12/2013 | Ovenden | G06Q 10/0633 |
| | | | | 705/7.11 |
| 8,730,816 | B2* | 5/2014 | Carey | H04L 43/0823 |
| | | | | 370/237 |
| 8,930,520 | B2* | 1/2015 | Bechtel | G06F 17/30994 |
| | | | | 709/203 |
| 8,966,392 | B2* | 2/2015 | Antony | G05B 19/41875 |
| | | | | 345/418 |
| 9,813,460 | B2* | 11/2017 | Barber-Mingo | H04L 65/4015 |
| 2006/0190473 | A1* | 8/2006 | Ovsyannikov | G06F 17/30368 |
| 2006/0200832 | A1* | 9/2006 | Dutton | G06Q 10/10 |
| | | | | 719/318 |
| 2007/0192720 | A1* | 8/2007 | Alsup | G06F 3/0486 |
| | | | | 715/769 |
| 2008/0134080 | A1* | 6/2008 | Moore | G06F 9/451 |
| | | | | 715/786 |
| 2009/0265430 | A1* | 10/2009 | Bechtel | G06F 17/30994 |
| | | | | 709/205 |
| 2011/0119374 | A1* | 5/2011 | Ruhl | G06F 17/3089 |
| | | | | 709/224 |
| 2012/0144020 | A1* | 6/2012 | Carey | G06Q 10/06 |
| | | | | 709/224 |
| 2014/0006267 | A1* | 1/2014 | Clarke | G06Q 10/087 |
| | | | | 705/39 |
| 2015/0235164 | A1* | 8/2015 | Key | G06Q 10/063118 |
| | | | | 705/7.17 |
| 2016/0254969 | A1* | 9/2016 | Ranganathan | G06F 11/079 |
| | | | | 709/224 |
| 2017/0123880 | A1* | 5/2017 | Ranganathan | G06F 11/079 |

* cited by examiner

ALERT MANAGEMENT WITHIN A NETWORK BASED VIRTUAL COLLABORATIVE SPACE

CROSS-REFERENCE TO RELATED APPLICATIONS

This application is a continuation-in-part of U.S. patent application Ser. No. 14/610,747, titled "Network Based Virtual Collaborative Problem Solving Space," filed, Jan. 30, 2015, the disclosure of which is incorporated herein by reference.

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provide the service more difficult to track and monitor.

When a distributed application has a performance issue, it may require more than one person to diagnose the cause and determine a solution. Gathering several people to diagnose a performance issue for a network application can be difficult. When multiple users are participating in a virtual collaborative space, it can be difficult to track and manage things such as alerts on data being monitored.

There is a need in the art for providing an improved collaboration system for working through performance issues in network based systems.

SUMMARY

The present technology provides a network-based collaborative problem solving space for managing alerts. The virtual collaboration space includes an interface that allows multiple users to view streaming time series data, generate alerts for time series data, and view triggered alerts based on a threshold associated with the generated alert. Alert generation and triggering is automatically tracked within an event log within the interface, with event log entries associated with the alert generation and the triggering of an alert. When an alert is triggered, a link to the event log entry associated with generating the alert is automatically created, allowing users of the virtual collaboration space to quickly and easily view the alert generation log entry as well as other entries surrounding the alert generation entry. By reviewing the alert generation and surrounding event log entries, users of the virtual collaboration space may gain context as to the reasoning and motivations contained in the event log entries for generating the original alert and thereby better understand whether the triggering of the alert is a serious issue.

An embodiment may include a method for providing alerts in a virtual collaboration space. A server can transmit content page data for a collaborative interface with at least one graphic element to a plurality of client devices. The at least one graphic element can be associated with time series data for a distributed business transaction executed over a plurality of servers. An alert can be created based on a threshold for the time series data, the threshold received from a first client device of the plurality of client devices. A first log entry can be created for the created alert, wherein the first log entry provided within the collaborative interface. The time series data can be detected to exceed the threshold. An alert event in response to detecting the threshold was exceeded, the alert event associated with an identifier for the first user, the first time, and data for the first log entry.

An embodiment may include a system for monitoring a business transaction. The system may include a processor, memory and one or more modules stored in memory and executable by the processor. When executed, the one or more modules may provide content page data for a collaborative interface to a plurality of client devices. The collaborative interface can include time series data for a distributed business transaction executed over a plurality of servers. The one or more modules may execute to create an alert based on a threshold for the time series data, the threshold received from a first client device of the plurality of client devices. The modules can create a first log entry for the created alert, the first log entry provided within the collaborative interface, and generate an alert event in response to detecting the threshold was exceeded by the time series data, the alert event associated with an identifier for the first user, the first time, and data for the first log entry.

DETAILED DESCRIPTION

The present technology provides a network-based collaborative problem solving space for managing alerts. The virtual collaboration space includes an interface that allows multiple users to view streaming time series data, generate alerts for time series data, and view triggered alerts based on a threshold associated with the generated alert. Alert generation and triggering is automatically tracked within an event log within the interface, with event log entries associated with the alert generation and the triggering of an alert. When an alert is triggered, a link to the event log entry associated with generating the alert is automatically created, allowing users of the virtual collaboration space to quickly and easily view the alert generation log entry as well as other entries surrounding the alert generation entry. By reviewing the alert generation and surrounding event log entries, users of the virtual collaboration space may gain context as to the reasoning and motivations contained in the event log entries for generating the original alert and thereby better understand whether the triggering of the alert is a serious issue.

Figure 1:
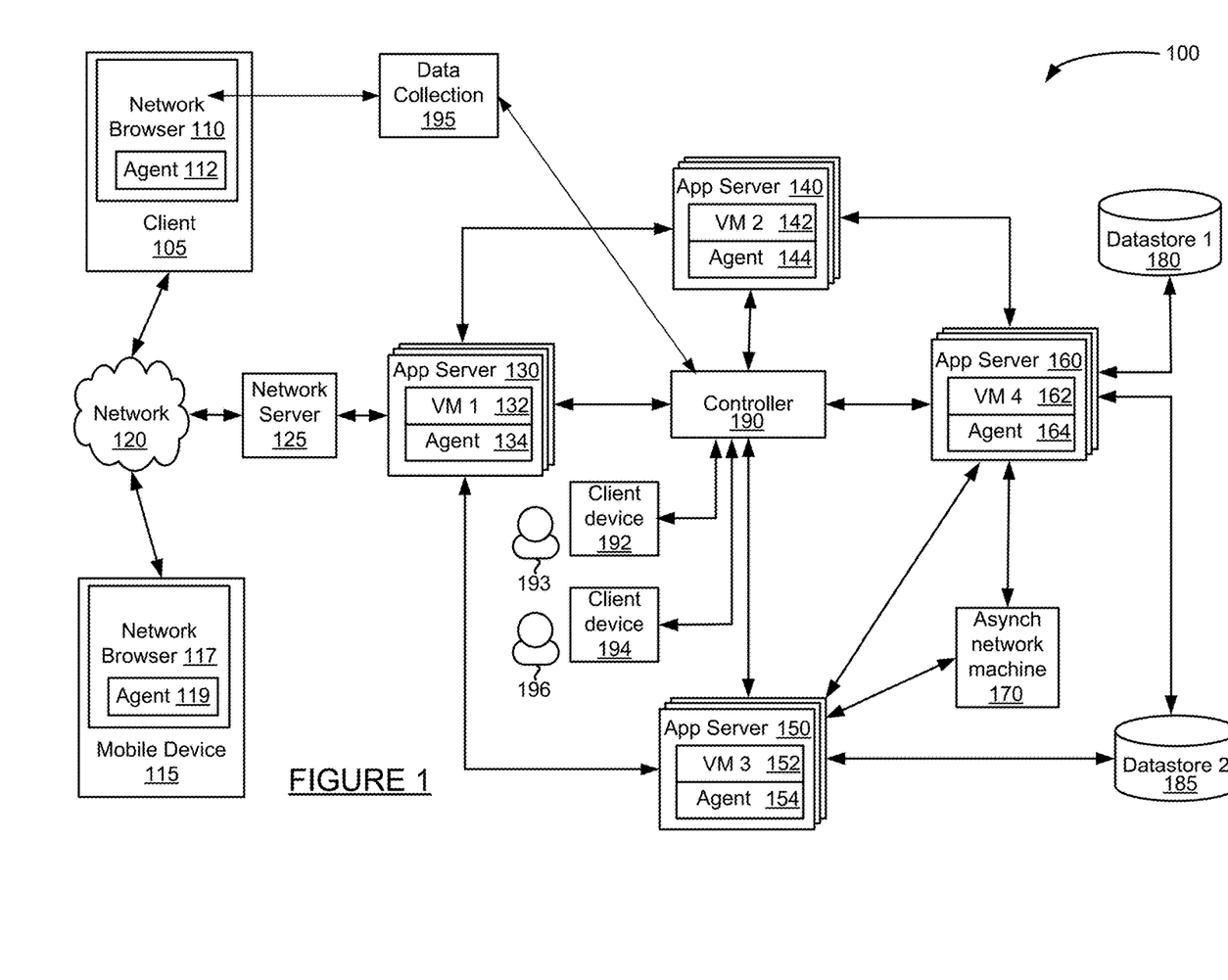
FIG. 1 is a block diagram of an exemplary system for monitoring a distributed application.

FIG. 1 is a block diagram of a system for monitoring a distributed application. The system of FIG. 1 may be monitored by one or more agents, data may be collected during the monitoring, and performance issues may be identified for the distributed application. A virtual war room may be initiated to address the identified performance issue.

System 100 of FIG. 1 includes client device 105, 192, and 194, mobile device 115, network 120, network server 125, application servers 130, 140, 150 and 160, asynchronous network machine 170, data stores 180 and 185, and controller 190.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120. Mobile device 115 is connected to network 120 and may be implemented as a portable device suitable for receiving content over a network, such as for example a mobile phone, smart phone, tablet computer or other portable device. Both client device 105 and mobile device 115 may include hardware and/or software configured to access a web service provided by network server 125.

Network 120 may facilitate communication of data between different servers, devices and machines. The network may be implemented as a private network, public network, intranet, the Internet, a Wi-Fi network, cellular network, or a combination of these networks.

Network server 125 is connected to network 120 and may receive and process requests received over network 120. Network server 125 may be implemented as one or more servers implementing a network service. When network 120 is the Internet, network server 125 may be implemented as a web server. Network server 125 and application server 130 may be implemented on separate or the same server or machine.

Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1, and may implement both an application server and network server on a single machine.

Application server 130 may include applications in one or more of several platforms. For example, application server 130 may include a Java application, .NET application, PHP application, C++ application, AJAX, or other application. Different platforms are discussed below for purposes of example only.

Virtual machine 132 may be implemented by code running on one or more application servers. The code may implement computer programs, modules and data structures to implement, for example, a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132. Alternatively, other code may be byte code instrumented, such as code comprising an application which executes within virtual machine 132 or an application which may be executed on application server 130 and outside virtual machine 132.

Agent 134 on application server 130 may be installed on application server 130 by instrumentation of object code, downloading the application to the server, or in some other manner. Agent 134 may be executed to monitor application server 130, monitor virtual machine 132, and communicate with byte instrumented code on application server 130, virtual machine 132 or another application or program on application server 130. Agent 134 may detect operations such as receiving calls and sending requests by application server 130 and virtual machine 132. Agent 134 may receive data from instrumented code of the virtual machine 132, process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

Agent 134 may be a Java agent, .NET agent, PHP agent, or some other type of agent, for example based on the platform which the agent is installed on.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at least a portion of a distributed business transaction. Agents 144, 154 and 164 may monitor the virtual machines 142-162 or other software processing requests, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. Controller 190 may receive runtime data from each of agents 134-164, associate portions of business transaction data, communicate with agents to configure collection of runtime data, and provide performance data and reporting through an interface. The interface may be viewed as a web-based interface viewable by mobile device 115, client device 105, or some other device. In some embodiments, a client device 192 may directly communicate with controller 190 to view an interface for monitoring data.

Controller 190 may install an agent into one or more virtual machines and/or application servers 130. Controller 190 may receive correlation configuration data, such as an object, a method, or class identifier, from a user through client device 192.

Controller 190 may collect and monitor customer usage data collected by agents on customer application servers and analyze the data. The controller may report the analyzed data via one or more interfaces, including but not limited to a dashboard interface and one or more reports.

Data collection server 195 may communicate with client 105, 115 (not shown in FIG. 1), and controller 190, as well as other machines in the system of FIG. 1. Data collection server 195 may receive data associated with monitoring a client request at client 105 (or mobile device 115) and may store and aggregate the data. The stored and/or aggregated data may be provided to controller 190 for reporting to a user.

Clients 192 and 194 may be used by users 193 and 196, respectively, to access a virtual collaboration space provided by controller 190. The virtual collaboration space may include an interface that receives input from users 193 and 196 (through client devices 192 and 194). The input may request one or more graphical elements to be displayed within the interface, create one or more alerts for time series data displayed through a graphical element, and perform other tasks as part of monitoring the health of a distributed business transaction through the interface.

Figure 2:
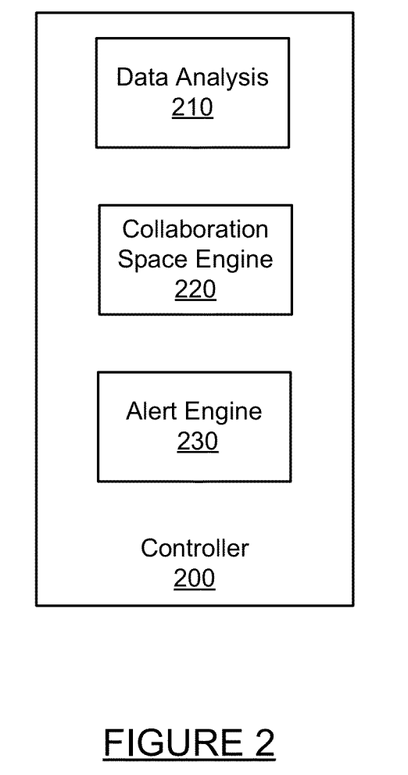
FIG. 2 is a block diagram of an exemplary controller.

FIG. 2 is a block diagram of a controller. Controller 200 includes data analysis module 210, virtual war room engine 220, and alert engine 230. Data analysis module 210 may receive data from one or more agents installed on one more remote machines implementing a distributed business transaction. Data analysis module 210 may analyze the data to determine performance issues in portions of the distributed business transaction, such as a particular node, tier, application, method of other portion in the dynamic execution path of the business application.

Collaboration space engine 220 may provide the collaborative space for problem solving a detected performance issue. The collaboration space engine 220 may load a template associated with the performance issue and populate the template with graphical elements and data associated with the performance issue. A graphical elements can include a single metric display, a status light, a graph such a plot, bar graph, pie graph, or other graph, a graphical display of streaming time series data For example, for a backend performance issue, a template associated with the backend performance issue may include a graphical representation of streaming time series data for response times of the backend, an indication of the CPU usage, and the violation of any health rules that apply to the backend.

Alert engine 230 may include one or more software modules, objects or programs that handle generating an alert based on received input from a user, the controller, or an agent, as well as triggering an alert. The alert engine may store and access a data threshold, tasks to perform in response to triggering an alert, retrieving and storing data associated with an alert, such as for example an alert threshold, a user that generated an alert, a time stamp associated with alert generation, an identifier for a data series against which an alert has been generated, the time an alert is triggered, the data value that triggered the alert, and event log entry identifiers associated with generating the alert and triggering an alert.

Figure 3:
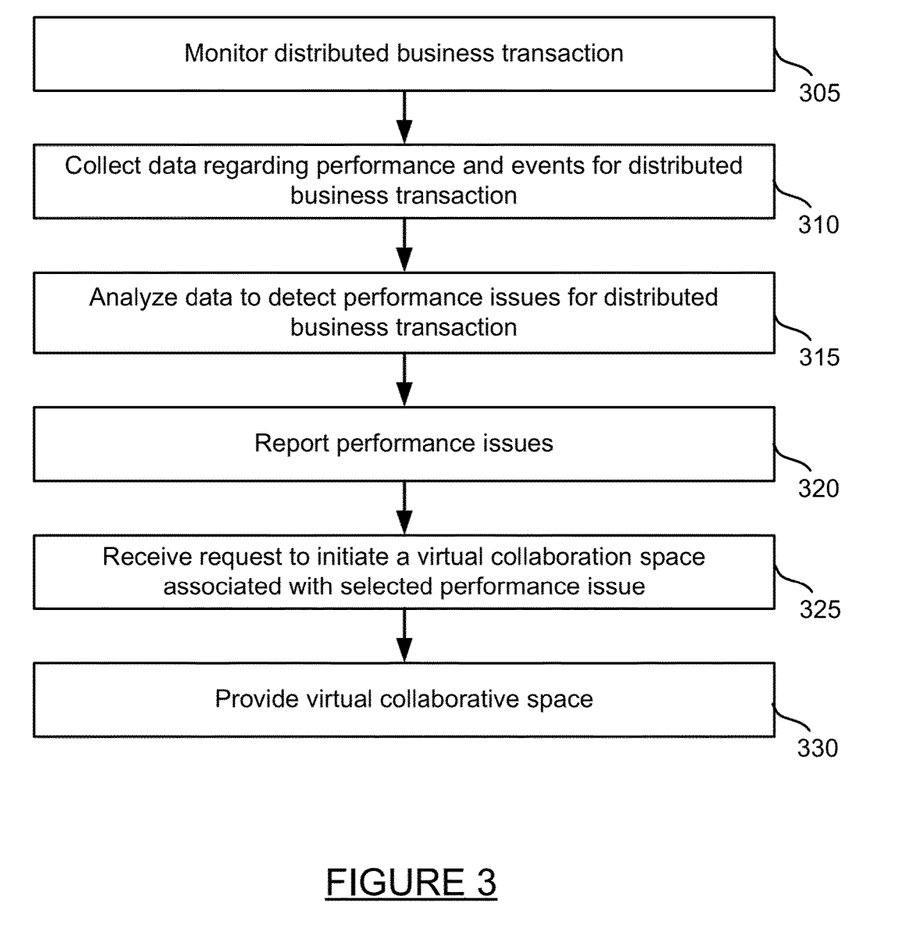
FIG. 3 is an exemplary method for initiating a virtual war room.

FIG. 3 is a method for initiating a virtual war room. First, a distributed business transaction may be monitored at step 305. The monitoring may be performed by one or more agents installed on one or more servers that implement the distributed business transaction.

Data regarding performance and events for the distributed business transaction may be collected at step 310. The data may be collected by agents on the servers implementing the transaction and reported to a controller by each agent. The reported data may or may not be aggregated.

The collected data may be analyzed by the controller to detect any performance issues for distributed business transaction. A performance issue may be determined, for example, as a portion of the transaction that is determined to be slower than a baseline average time for that portion to complete, an error condition, an unresponsive application or machine, or some other issue with performance of the distributed business transaction.

The performance issues may be reported at step 320. Reporting the performance issues may include providing a list of issues found in the business transaction, a graphical representation of the issues, or some other communication of the issues.

Figure 5:
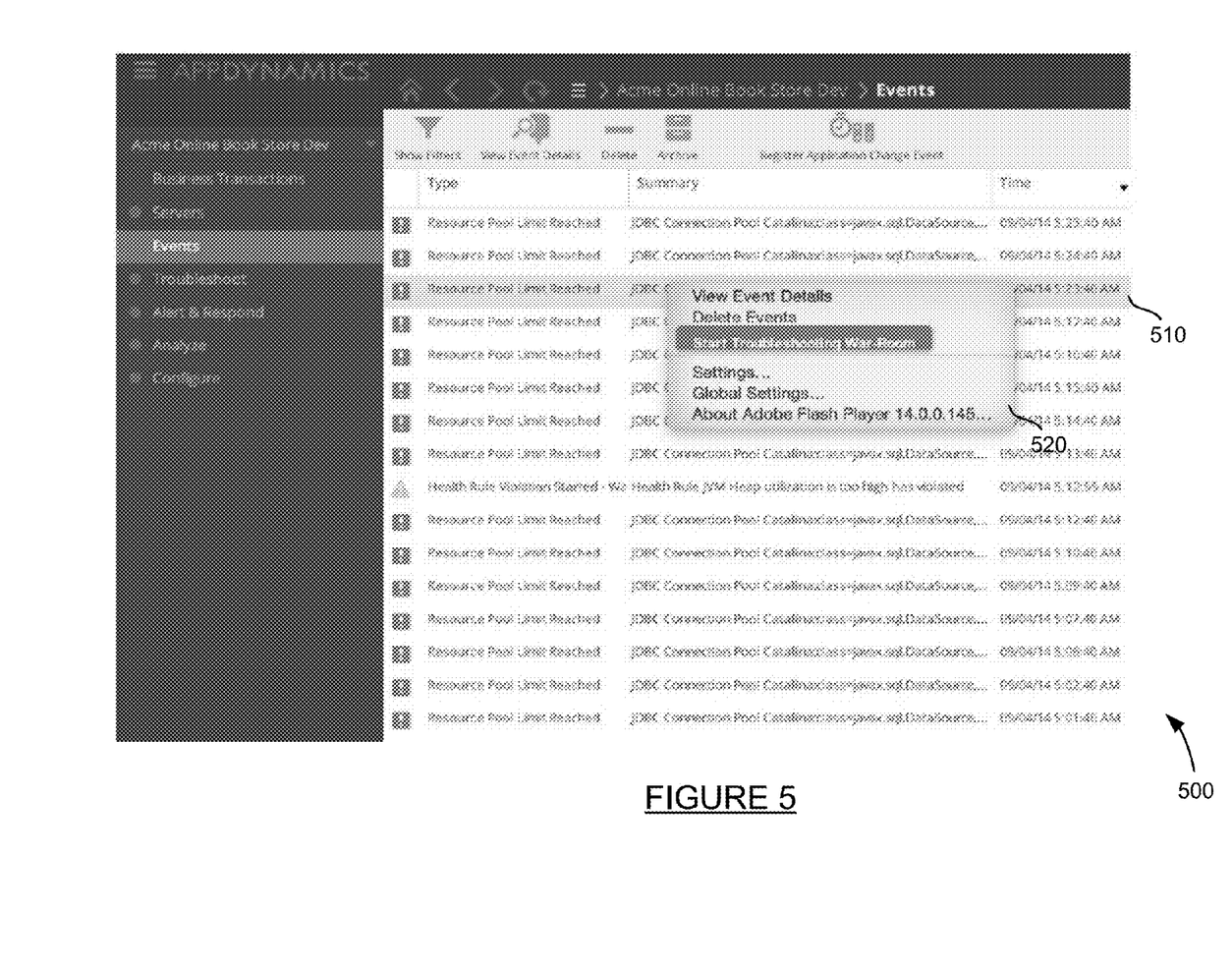
FIG. 5 is an exemplary interface for initiating a virtual war room for a performance issue.

A request to initiate a virtual collaboration space is received by the controller at step 325. In some instances, the request can be received through a selection received through an interface. FIG. 5 is an interface for initiating a virtual war room for a performance issue. The interface of FIGURE includes a list of performance issues with column data such as type, summary and time. Also included is a graphical indicator providing a severity level for each performance issue. In the example of FIG. 5, when a user positions a mouse over a line associated with a performance issue and provides input such as a mouse right click, a menu of selectable options may appear. The menu may include a selection that initiates a virtual collaboration space (i.e., virtual war room).

Once the request to initiate the virtual collaboration space is received, the space may be provided at step 330. Providing the virtual collaboration space may include loading a template with one or more graphical elements, providing war room functionality to participants, and saving the resulting virtual collaboration space as a template. More details for providing the virtual collaborative space is discussed with respect to the method of FIG. 4.

Figure 4:
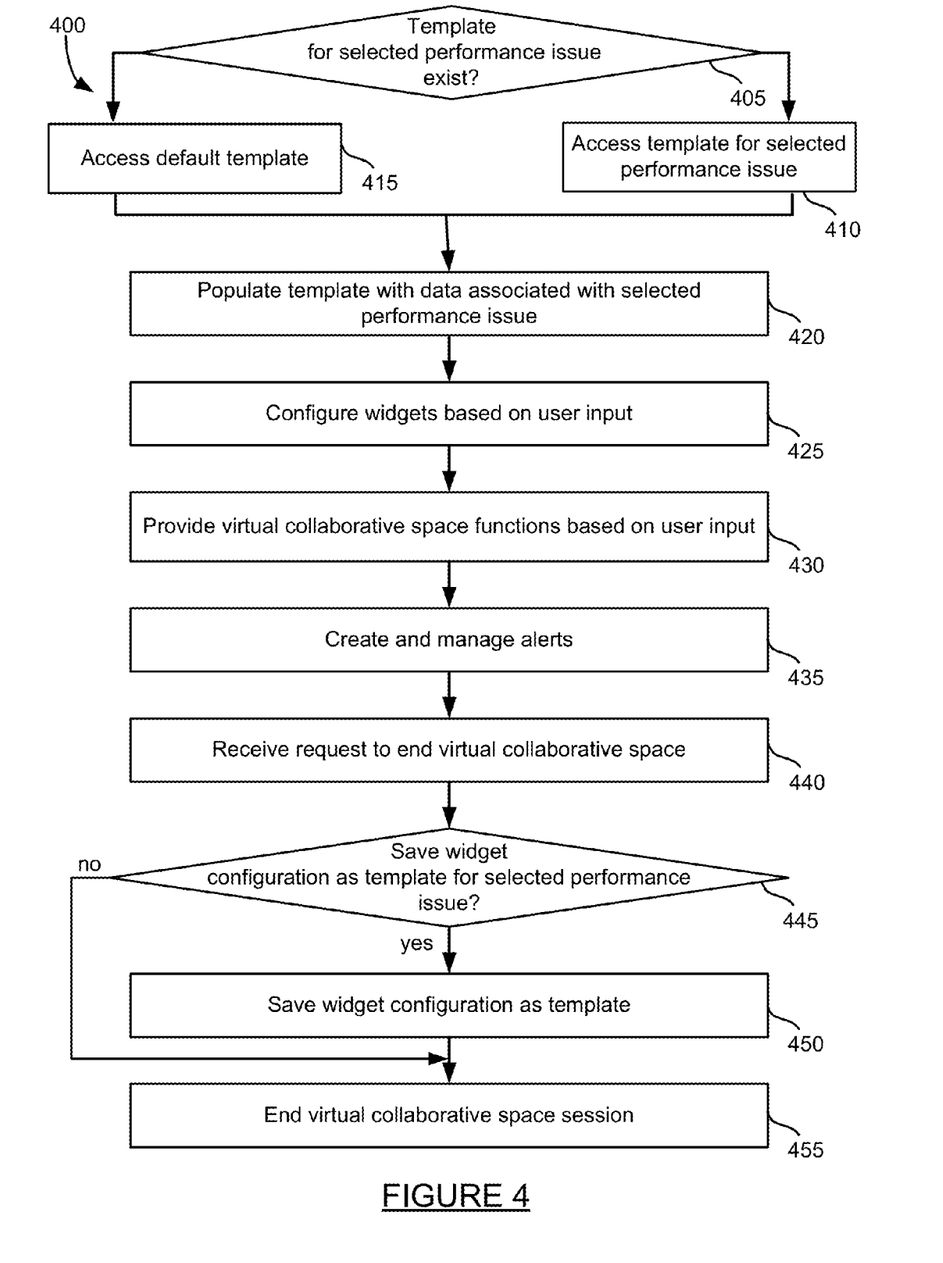
FIG. 4 is an exemplary method for managing a virtual war room.

FIG. 4 is a method for managing a virtual war room. The method of FIG. 4 provides more detail for step 330 of the method of FIG. 3. A determination is made as to whether a virtual collaboration space template exists for the selected performance issue. If no template exists, a default template is loaded into the virtual space at step 415. The virtual space may be an empty virtual space or pre-loaded with one or more graphical elements that may be commonly used for many performance issues. The method then continues to step 420. If a template does exist, the template for the selected performance issue is accessed at step 410 and the method continues to step 420.

The template, if any, is populated with data associated with selected performance issue data at step 420. The data may include streaming time series data that dynamically updates within the template. The template may also include one or more graphical elements that were found helpful by one or more people who addressed the selected performance issue previously.

Graphical elements are configured based on user input at step 425. Configuring a graphical elements may include selecting the particular graphical elements and data type to display by the graphical elements (streaming time series or metric), selecting the source of the data to display in the graphical elements, and other configuration.

A graphical element may display different data related to a performance issue. For example, graphical elements may be a single metric display, a status light, a graph such a plot, bar graph, pie graph, or other graph, a graphical display of streaming time series data. Graphical elements may include other graphical representations commonly used numerical data, percentages, and values.

Virtual collaboration space functionality is provided based on user input at step 430. The functionality may include chatting, sharing a link to the virtual space, passing or sharing membership with another participant, and other features.

Graphical elements may be dynamically updated with time series data at step 435. The data provided in the graphical element will change over time as the streaming data collected and provided by the controller changes Returning to FIG. 4, a request to end the virtual collaborate room is received at step 440. A determination may be made as to whether a graphical element configuration should be saved as a template for selected performance issue at step 445. If the graphical element configuration should not be saved, the virtual collaboration space ends without saving a template at step 455. If the graphical element configuration should be saved as a template, the template is saved with an association to the particular performance issue at step 450. The virtual collaboration space then ends at step 455.

Figure 6:
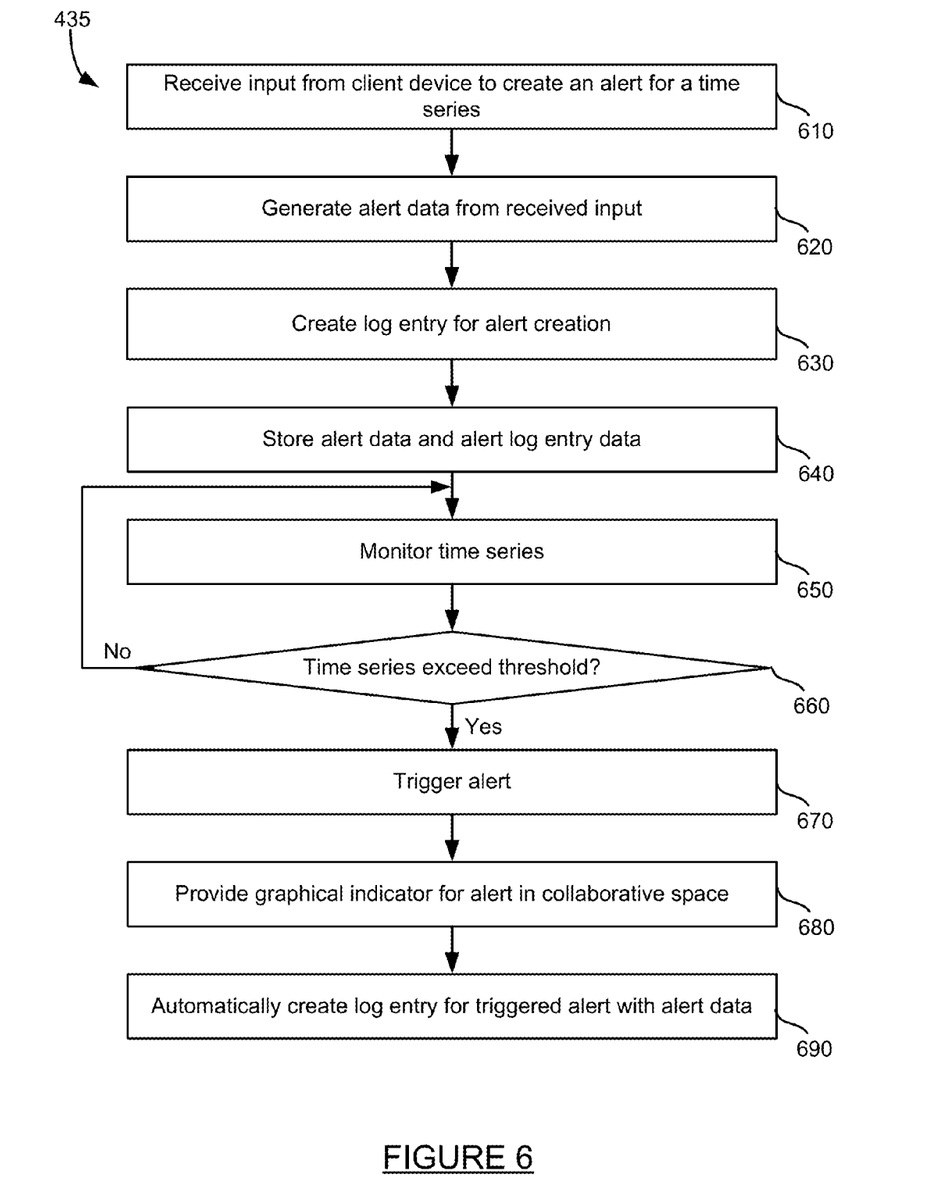
FIG. 6 is an exemplary method for creating and managing alerts

FIG. 6 is an exemplary method for creating and managing alerts. The method of FIG. 6 provides more detail for step 435 of the method of FIG. 4. Input is received from a client device to create an alert for a time series at step 610. The client device may be one of many client devices in communication with a controller that provides a virtual collaboration space. Alert data may be generated from the received input at step 620. The received input may include a threshold, a particular graphical element or set of data to create an alert for, and an identifier such as a username for the user creating the alert. For example, input may be received from a client device selecting a streaming time series and a threshold indicating that an alert should be generated if the particular time series data exceeds above or dips below a particular threshold value.

A log entry can be automatically created for the generated alert at step 630. The log entry can indicate that a particular alert was created for a particular element at a particular time. A log entry for a generated alert may also indicate a threshold for the alert as well as a time stamp for the generation of the alert. An exemplary interface for showing a log entry created for an alert is discussed with respect to the interface of FIG. 8.

Alert data may be stored along with alert log entry data at step 640. The alert data may include the threshold received as input to create the alert and tasks to perform if an alert is triggered, such as for example emailing an administrator or users participating in the current virtual session. The alert log entry data may include a time stamp at which the alert was created, a user that created the alert, a graphical element for which the alert was created, and a log entry identifier created in response to the alert been generated.

The time series data associated with the generated alert is monitored at step 650. Monitoring the time series data may include receiving the time series data from one or more agents by the controller, comparing the received data to the threshold by the controller, and determining if the time series data has violated the threshold (e.g., exceeded a maximum threshold or dipped below a minimum threshold). In some implementations, one or more agents may monitor the time series data as it is obtained by the agent.

A determination may be made as to whether the monitored time series data exceeds the threshold associated with the alert at step 660. If the time series does not exceed a threshold, the controller and/or agent continues to monitor the time series data. The time series does exceeds the threshold, an alert is triggered at step 670. Triggering an alert may include creating an alert object and storing the object, initiating one or more actions to be performed, such as for example sending an electronic message to the creator of the alert or one or more users in the current session during which the alert was created, communicating the triggered alert to an administrator, or other actions to communicate the occurrence and/or details of the triggered alert.

A graphical indicator may be provided for the alert in the collaborative space at step 680. The graphical indicator may indicate that an alert occurred at a particular time, the value of the time series data that exceeded (or dipped below) a threshold, the threshold associated with the alert, and information regarding the log entry which created the alert. More information regarding providing a graphical indicator for an alert in a virtual collaborative space is discussed with respect to the exemplary interface of FIG. 9.

A log entry is automatically created for the triggered alert by the controller at step 690. The created log entry may include alert data and other information, such as for example a time stamp at which the alert was triggered, a user which created the alert, a link to the log entry associated with the created alert, the value of the time series that exceeded the threshold, and the threshold associated with the alert. More detail for creating a log entry for a triggered alert with alert data is discussed with respect to the exemplary method of FIG. 7.

Figure 7:
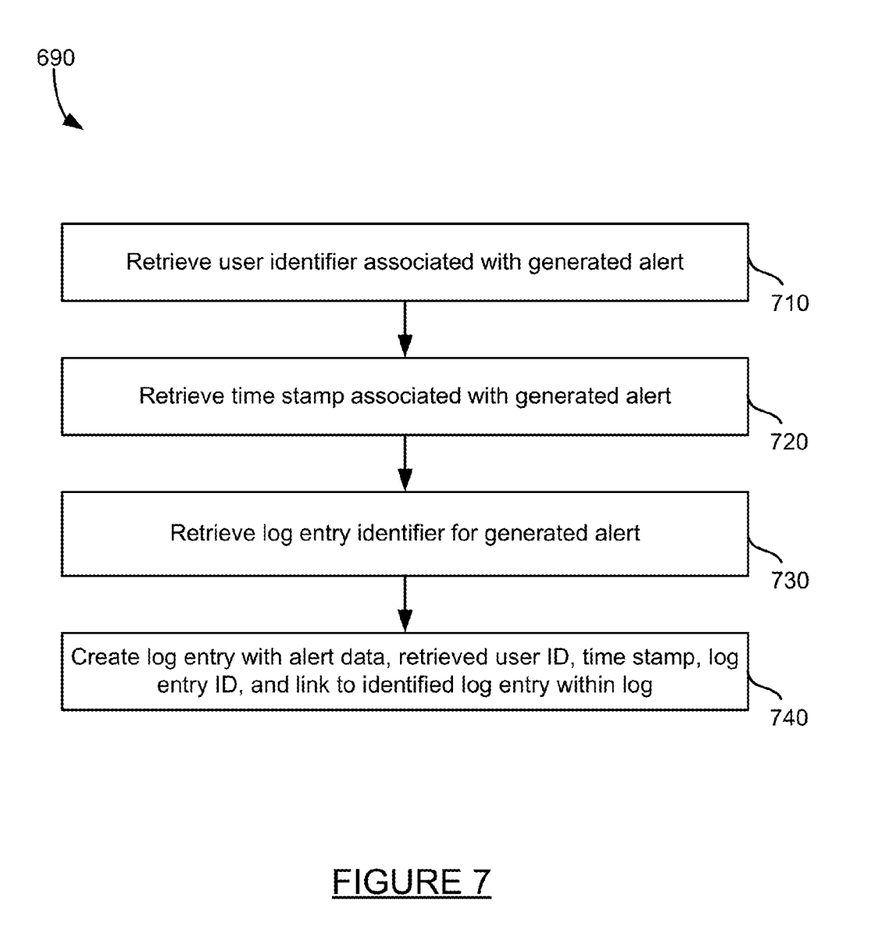
FIG. 7 is an exemplary method for automatically creating a log entry in response to an alert.

FIG. 7 is an exemplary method for automatically creating a log entry in response to an alert. The method of FIG. 7 provides more detail for step 690 of the method of FIG. 6. The user identifier associated with the generated alert is retrieved at step 710. The user identifier may include a user name for the user which created the alert through the virtual collaborative interface. A time stamp associated with the generated alert is retrieved at step 720. The timestamp indicates the particular time at which the alert was generated by the particular user. A log entry identifier for the generated alert is retrieved at step 730. In some implementations, each entry within an event log is associated with a unique identifier. A log entry was created in response to generating the alert which has been triggered is retrieved at step 730.

A new log entry is generated based on the triggered alert at step 740. The new log entry includes a user ID associated with the originally generated alert, a time stamp associated with the originally generated alert, log entry ID associated with the generate alert, a link to the identified log entry associated with the generated alert, the alert threshold, the time at which the alert was triggered, and the value of the data which exceeded (or dipped below) the threshold. The created log entry is displayed within the event log window within a virtual collaboration interface.

Figure 8:
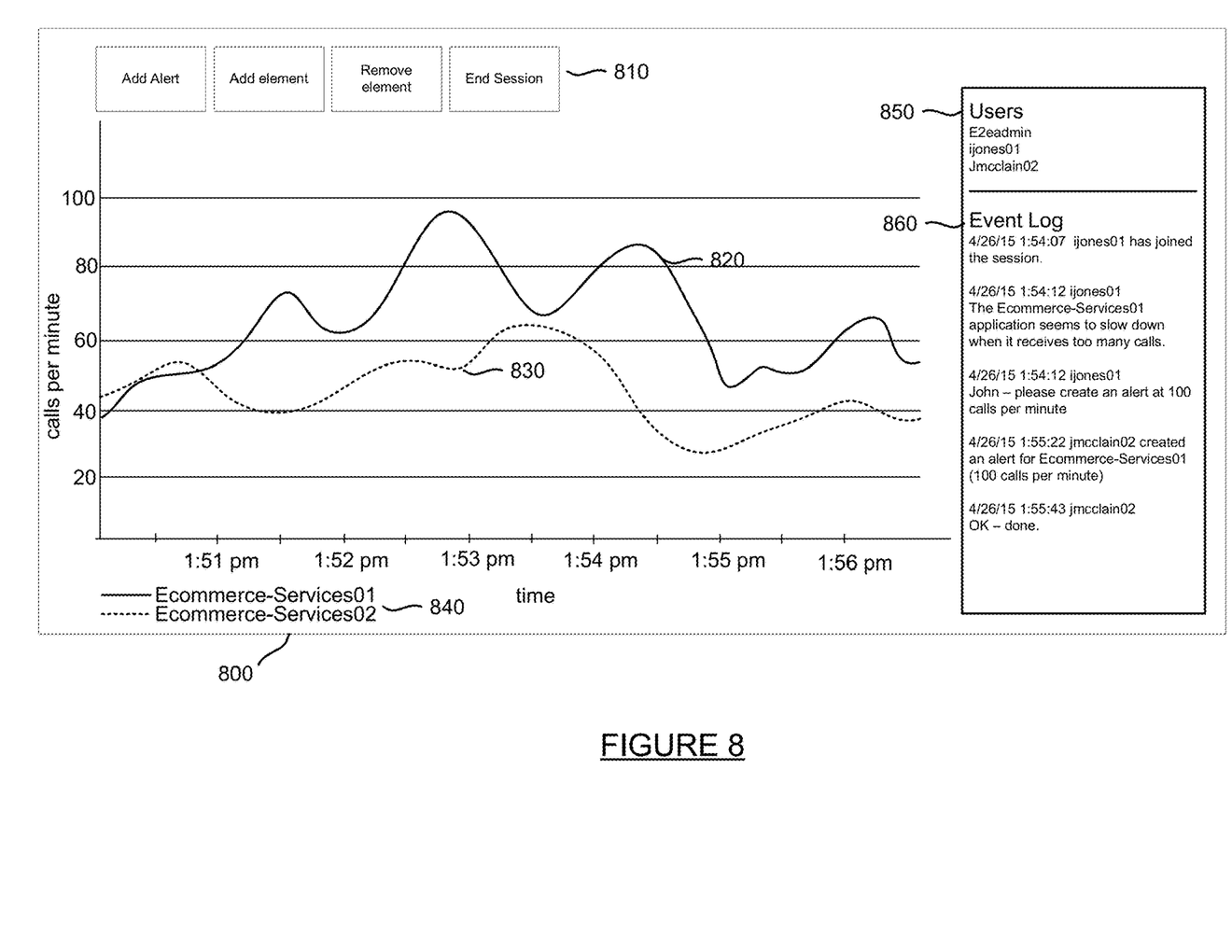
FIG. 8 is an exemplary interface for generating an alert.

FIG. 8 is an exemplary interface for generating an alert. The exemplary interface 800 of FIG. 8 provides a virtual collaborative space where users may collectively view historic and real-time time series data. Each of the users may generate an alert on any data provided through the collaborative interface. Interface 800 includes control buttons 810, a first graph of time series data 820, a second graph of time series data 830, a list of time series data provided 840, a list of users 850, and an event log 860.

Control buttons 810 include one or more buttons, pull-down menus, or other graphical elements that allow user to manipulate what data is displayed in interface 800, when alerts are generated within an interface 800, and other functions to manage the collaborative interface and alerts generated within data displayed within the interface. Exemplary buttons displayed within the interface 800 include an ad alert button, add element button, remove element button, and a session but.

The "ad alert" button allows a user to add an alert for a selected graphical element associated with time series data. For example, a user may select time series data graphical element 820 or 830, followed by a selection of the "add alert" button. Additional information can be received through the interface from the user regarding the alert, such as for example a maximum threshold, a minimum threshold, actions to take in response to an alert been triggered, and how long the selected time series data should be monitored for the alert (lifespan of the alert). Actions to take in response to the alert being triggered can include emailing, texting, or otherwise communicating with one or more users participating in the collaborative session, communicating with one or more individuals not participating in the collaborative session, configuring a graphical element to be displayed if alert is triggered, configuring whether or not to create an event log entry in response to a triggered alert, and other actions.

The "ad element" button may be used to add an element, such as a graphical element that displays values of time series data. The "remove element" button allows a graphical element to be removed from the collaborative interface. The "end session" button may end a session or allow a particular user to exit the session.

Usernames for users logged into the current collaborative session may be displayed within the user window 850. In the exemplary interface 800, the usernames include "E2eadmin," "ijones01," and "jmcclain02." Each of the users within a collaborative interface may type a message into the event log, add or remove an element, and add an alert within the virtual collaborative interface.

Event log 860 may display messages entered by any user within the collaborative session as well as provide system generated log entries, for example for events that occur for the displayed graphical elements. The events may include generation of an alert for a particular graphical element, a triggered alert for a particular graphical element, the addition of a graphical element, and the removal of a graphical element. For example, event log 860 in the interface 800 includes messages created by users ijones01 and jmcclain02 regarding a graphical element associated with an application "Ecommerce-Services01." Event log 860 also includes a log entry automatically generated for the creation of alert. The log entry associated with the alert generation includes a time stamp of "4/26/15 1:55:22," indicates that an alert was created by jmmclain02 for the application "Ecommerce-Services01," and that the alert includes a threshold of "100 calls per minute."

The event log entries before and after the log entry associated with the generated alert include messages between users of the collaboration interface regarding the performance of a particular application. These surrounding entries provide valuable context for the reasons behind generating the alert for that application. By saving the log entry associated with the alert generation, and allowing users to return to a portion of the event log associated with creating an alert after the alert is triggered, users of the interface may quickly ascertain why the alert was triggered and whether the conditions under which the alert was triggered provide more insight for the reason the alert was originally generated.

Figure 9:
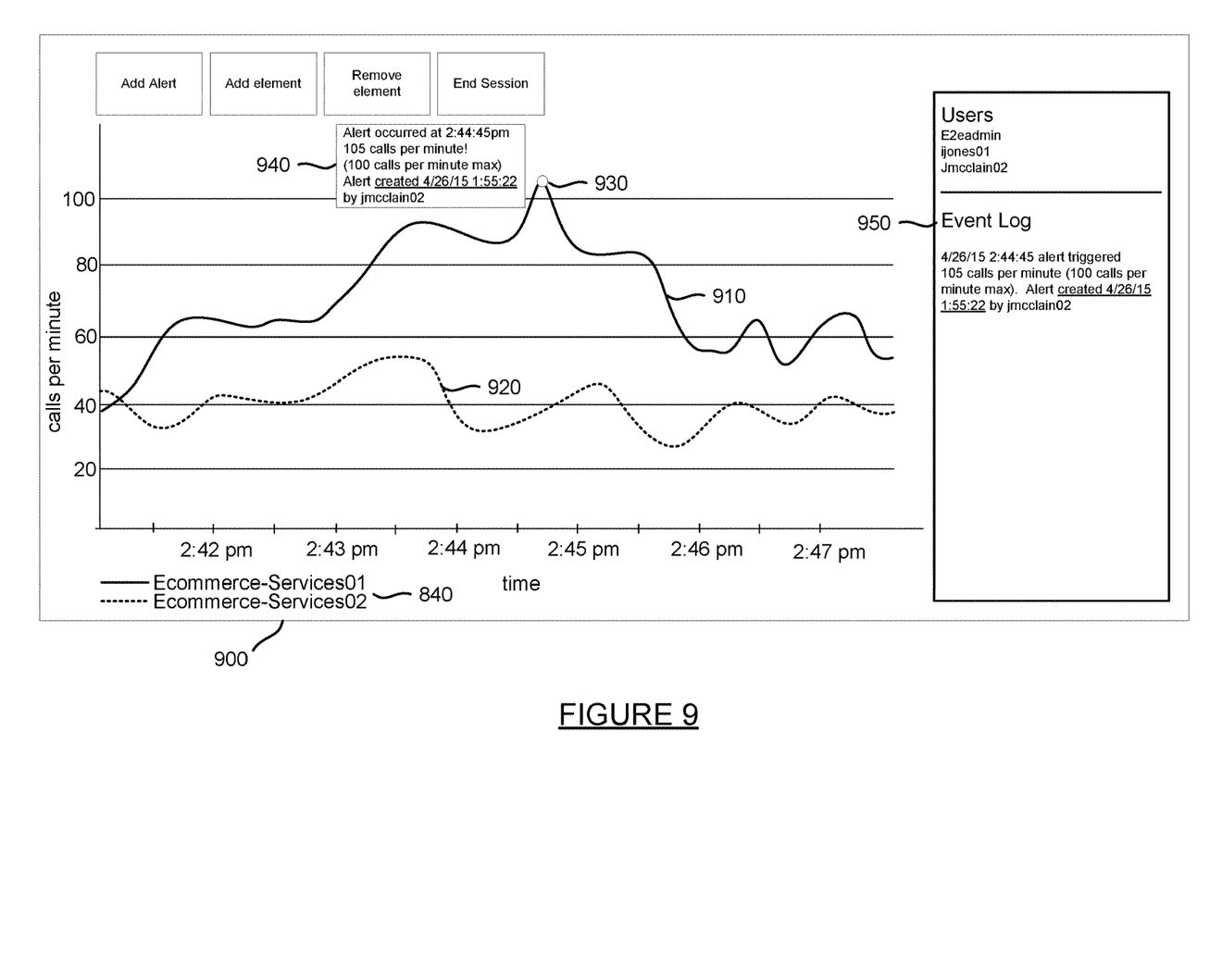
FIG. 9 is an exemplary interface for providing a log entry for a triggered alert.

FIG. 9 is an exemplary interface for providing a log entry for a triggered alert. The exemplary interface 900 of FIG. 9 interface 900 is similar to interface 800 of FIG. 8 in that interface 900 includes graphical elements 910, 920, a list of users within the current session, and an event log 950. Interface 900 illustrates a collaborative interface at the time an alert is triggered. The time series data for graphical element 910 exceeds a threshold associated with an alert at approximately point 930. In response to the threshold being exceeded, a graphical indicator 940 is generated within the interface. The graphical indicator 940 indicates that an alert occurred at a particular time, and the value of the time series data which generated the alert. The graphical indicator 940 also indicates, in parentheses, the threshold associated with the alert.

Graphical indicator 940 includes a link to the event log entry at which the alert was generated, as well as the timestamp for the event log entry and the user which created the alert. The link to the event log entry is provided as a clickable link that reads "created 4/26/15 1:55:22", and is followed by the user name of the user which created the alert.

Event log 950 includes an event log entry that is automatically created in response to the triggered alert. The automatically generated event log entry indicates the time of the alert, the value of the time series data that exceeded the threshold, and the value of the threshold. The event log entry 950 also indicates the user name of the user that generated the link and includes a link to the event log entry generated when the alert itself was generated. By including a link to the event log entry associated with generating the alert, users of interface 900 may quickly access the event log at the time the alert was generated to determine the context and reasoning of users at that particular time which motivated them to generate the alert. The context and reasoning captured in the event log entries at the time the alert was generated may allow users to determine if the triggered alerts occurred for reasons expected or thought about at the time the alert was originally generated, and allows the users to return to those event log entries associated with generating the alert without having to scroll through dozens, hundreds or even thousands of event log entries in order to find the relevant entries associated with the alert generation.

Figure 10:
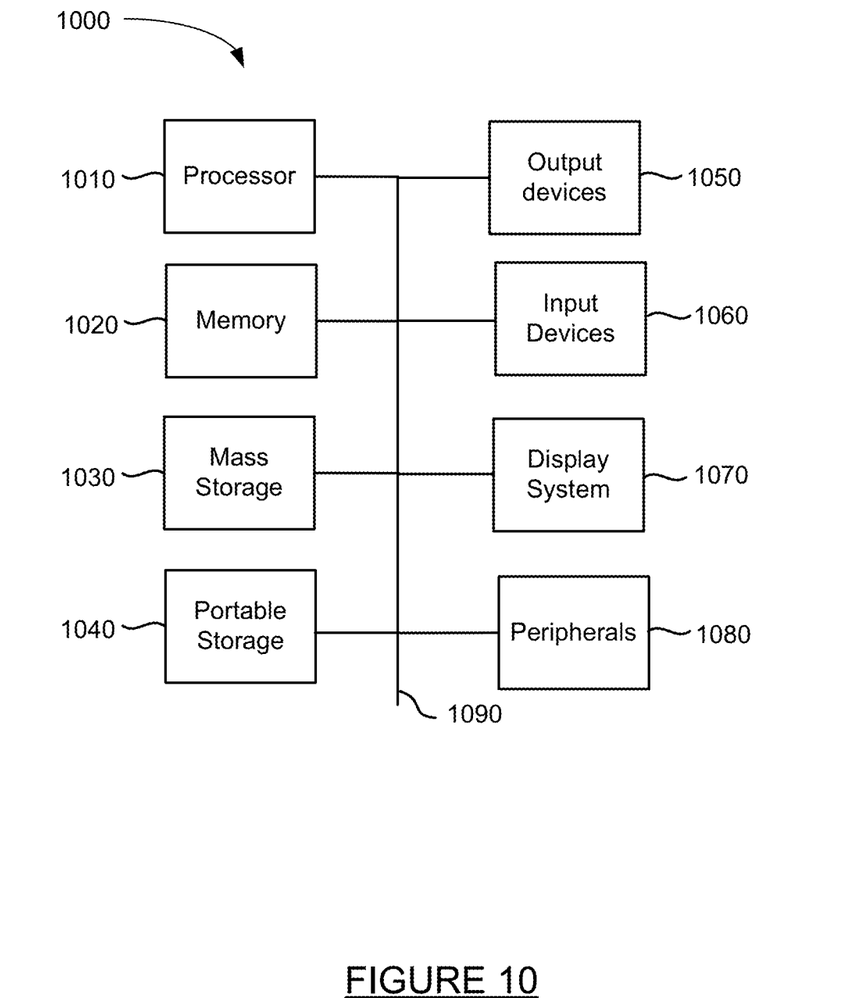
FIG. 10 is a block diagram of an exemplary system for implementing a computing device.

FIG. 10 illustrates an exemplary computing system 1000 that may be used to implement a computing device for use with the present technology. System 1000 of FIG. 10 may be implemented in the contexts of the likes of clients 105 and 192, network server 125, application servers 130-160, data stores 180-185, and controller 190. The computing system 1000 of FIG. 10 includes one or more processors 1094 and memory 104. Main memory 1094 stores, in part, instructions and data for execution by processor 104. Main memory 1094 can store the executable code when in operation. The system 1000 of FIG. 10 further includes a mass storage device 1030, portable storage medium drive(s) 1040, output devices 1050, user input devices 1060, a graphics display 1070, and peripheral devices 1080.

The components shown in FIG. 10 are depicted as being connected via a single bus 1090. However, the components may be connected through one or more data transport means.

For example, processor unit 104 and main memory 104 may be connected via a local microprocessor bus, and the mass storage device 1030, peripheral device(s) 1080, portable storage device 1040, and display system 1070 may be connected via one or more input/output (I/O) buses.

Mass storage device 1030, which may be implemented with a magnetic disk drive or an optical disk drive, is a non-volatile storage device for storing data and instructions for use by processor unit 104. Mass storage device 1030 can store the system software for implementing embodiments of the present invention for purposes of loading that software into main memory 104.

Portable storage device 1040 operates in conjunction with a portable non-volatile storage medium, such as a floppy disk, compact disk or Digital video disc, to input and output data and code to and from the computer system 1000 of FIG. 10. The system software for implementing embodiments of the present invention may be stored on such a portable medium and input to the computer system 1000 via the portable storage device 1040.

Input devices 1060 provide a portion of a user interface. Input devices 1060 may include an alpha-numeric keypad, such as a keyboard, for inputting alpha-numeric and other information, or a pointing device, such as a mouse, a trackball, stylus, or cursor direction keys. Additionally, the system 1000 as shown in FIG. 10 includes output devices 1050. Examples of suitable output devices include speakers, printers, network interfaces, and monitors.

Display system 1070 may include a liquid crystal display (LCD) or other suitable display device. Display system 1070 receives textual and graphical information, and processes the information for output to the display device.

Peripherals 1080 may include any type of computer support device to add additional functionality to the computer system. For example, peripheral device(s) 1080 may include a modem or a router.

The components contained in the computer system 1000 of FIG. 10 are those typically found in computer systems that may be suitable for use with embodiments of the present invention and are intended to represent a broad category of such computer components that are well known in the art. Thus, the computer system 1000 of FIG. 10 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 11:
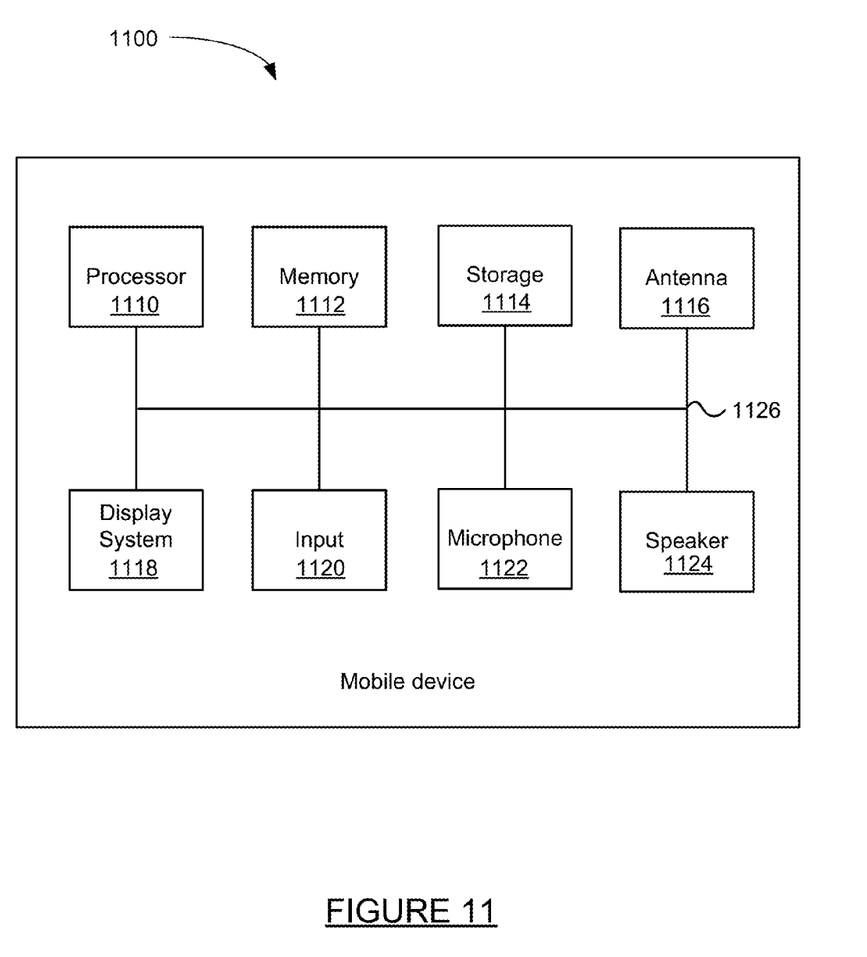
FIG. 11 is a block diagram of an exemplary system for implementing a mobile device.

FIG. 11 illustrates an exemplary mobile device system 1100 that may be used to implement a mobile device for use with the present technology, such as for mobile device 115. The mobile device 1100 of FIG. 11 includes one or more processors 115 and memory 1112. Memory 1112 stores, in part, programs, instructions and data for execution and processing by processor 115. The system 1100 of FIG. 11 further includes storage 1114, one or more antennas 1116, a display system 1118, inputs 1120, one or more microphones 1122, and one or more speakers 1124.

The components shown in FIG. 11 are depicted as being connected via a single bus 1126. However, the components 115-524 may be connected through one or more data transport means. For example, processor unit 115 and main memory 1112 may be connected via a local microprocessor bus, and storage 1114, display system 1118, input 1120, and microphone 1122 and speaker 1124 may be connected via one or more input/output (I/O) buses.

Memory 1112 may include local memory such as RAM and ROM, portable memory in the form of an insertable memory card or other attachment (e.g., via universal serial bus), a magnetic disk drive or an optical disk drive, a form of FLASH or PROM memory, or other electronic storage medium. Memory 1112 can store the system software for implementing embodiments of the present invention for purposes of loading that software into main memory 115.

Antenna 1116 may include one or more antennas for communicating wirelessly with another device. Antenna 1116 may be used, for example, to communicate wirelessly via Wi-Fi, Bluetooth, with a cellular network, or with other wireless protocols and systems. The one or more antennas may be controlled by a processor 115, which may include a controller, to transmit and receive wireless signals. For example, processor 115 execute programs stored in memory 1112 to control antenna 1116 transmit a wireless signal to a cellular network and receive a wireless signal from a cellular network.

Display system 1118 may include a liquid crystal display (LCD), a touch screen display, or other suitable display device. Display system 1170 may be controlled to display textual and graphical information and output to text and graphics through a display device. When implemented with a touch screen display, the display system may receive input and transmit the input to processor 115 and memory 1112.

Input devices 1120 provide a portion of a user interface. Input devices 1160 may include an alpha-numeric keypad, such as a keyboard, for inputting alpha-numeric and other information, buttons or switches, a trackball, stylus, or cursor direction keys.

Microphone 1122 may include one or more microphone devices which transmit captured acoustic signals to processor 115 and memory 1112. The acoustic signals may be processed to transmit over a network via antenna 1116.

Speaker 1124 may provide an audio output for mobile device 1100. For example, a signal received at antenna 1116 may be processed by a program stored in memory 1112 and executed by processor 115. The output of the executed program may be provided to speaker 1124 which provides audio. Additionally, processor 115 may generate an audio signal, for example an audible alert, and output the audible alert through speaker 1124.

The mobile device system 1100 as shown in FIG. 11 may include devices and components in addition to those illustrated in FIG. 11. For example, mobile device system 1100 may include an additional network interface such as a universal serial bus (USB) port.

The components contained in the computer system 1100 of FIG. 11 are those typically found in mobile device systems that may be suitable for use with embodiments of the present invention and are intended to represent a broad category of such mobile device components that are well known in the art. Thus, the computer system 1100 of FIG. 11 can be a cellular phone, smart phone, hand-held computing device, minicomputer, or any other computing device. The mobile device can also include different bus configurations, networked platforms, multi-processor platforms, etc. Various operating systems can be used including Unix, Linux, Windows, Macintosh OS, Google OS, Android OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for providing alerts in a virtual collaboration space, comprising:
 transmitting, by a server, content page data for a collaborative interface with at least one graphic element to a plurality of client devices, the at least one graphic element associated with time series data for a distributed business transaction executed over a plurality of servers;
 creating an alert based on a threshold for the time series data, the threshold received from a first client device of the plurality of client devices;
 creating a first log entry for the created alert, the first log entry provided within the collaborative interface,
 detecting the time series data exceeds the threshold;
 generating an alert event in response to detecting the threshold was exceeded, wherein the alert event associated with an identifier for a first user, the first time, and creation time stamp for the first log entry are provided on the collaborative interface automatically as a link; and
 including in the collaborative interface a second log entry in the log of events, the second log entry linked with the first log entry and displaying the first user identifier, the first time, alert data, the creation time stamp, and the link to the first log entry.

2. The method of claim 1, wherein the first log entry is provided within a log of events displayed within the collaborative interface.

3. The method of claim 2, wherein each client device may provide content to display within the log of events.

4. The method of claim 1, the alert data including the threshold, an identifier for the graphic element, and one or more values for the time series data.

5. The method of claim 1, further comprising creating a second log entry within the log of events based on detecting the time series data exceeds the threshold.

6. The method of claim 1, further comprising generating an alert based on input received from the first client device.

7. The method of claim 1, further comprising automatically updating graphic reporting element based on the generated alert.

8. The method of claim 1, wherein the log entry is provided within a log of events displayed within the collaborative interface.

9. A non-transitory computer-readable storage medium having embodied thereon a program, the program being executable by a processor to perform a method for providing alerts in a virtual collaboration space, the method comprising
 transmitting, by a server, user interface data with at least one graphic element to a plurality of client devices, the at least one graphic element associated with time series data for a distributed business transaction executed over a plurality of servers;
 receiving alert data for the time series data, the alert data received from a first client device of the plurality of client devices;
 creating a first log entry for an alert created based on the alert data, the first log entry provided within the collaborative interface; and
 generating an alert event in response to monitoring the time series data based on the alert data, the alert event associated with an identifier for a first user, the first time, and creation time stamp for the first log entry are provided on the collaborative interface automatically as a link; and
 including in the collaborative interface a second log entry in the log of events, the second log entry linked with the first log entry and displaying the first user identifier, the first time, alert data, the creation time stamp, and the link to the first log entry.

10. The non-transitory computer-readable storage medium of claim 9, the alert data including threshold data, the alert generated in response to detecting the time series data exceeded the threshold.

11. The non-transitory computer-readable storage medium of claim 9, wherein the first log entry is provided within a log of events displayed within the collaborative interface.

12. The non-transitory computer-readable storage medium of claim 11, wherein each client device may provide content to display within the log of events.

13. The non-transitory computer-readable storage medium of claim 9, further comprising providing a second log entry in the log of events, the second log entry including the first user identifier, the first time, and alert data.

14. The non-transitory computer-readable storage medium of claim 13, the alert data including the threshold, an identifier for the graphic element, and one or more values for the time series data.

15. The non-transitory computer-readable storage medium of claim 9, further comprising creating a second log entry within the log of events based on detecting the time series data exceeds the threshold.

16. A system for delivering an agent on a machine, comprising:
 a processor;
 memory; and
 one or more modules stored in memory and executable by the processor to provide content page data for a collaborative interface to a plurality of client devices, the collaborative interface including time series data for a distributed business transaction executed over a plurality of servers, create an alert based on a threshold for the time series data, the threshold received from a first client device of the plurality of client devices, create a first log entry for the created alert, the first log entry provided within the collaborative interface, generate an alert event in response to detecting the threshold was exceeded by the time series data, the alert event associated with an identifier for a first user, the first time, and creation time stamp for the first log entry are provided on the collaborative interface automatically as a link, and include in the collaborative interface a second log entry linked with the first log entry and in the log of events, the second log entry displaying the first user identifier, the first time, alert data, the creation time stamp, and the link to the first log entry.

\* \* \* \* \*